United States Patent
Mattes et al.

(10) Patent No.: US 6,784,792 B2
(45) Date of Patent: Aug. 31, 2004

(54) METHOD AND DEVICE FOR RECOGNITION OF A COLLISION WITH A PEDESTRIAN

(75) Inventors: Bernhard Mattes, Sachsenheim (DE); Gottfried Flik, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/069,678

(22) PCT Filed: May 31, 2001

(86) PCT No.: PCT/DE01/02062

§ 371 (c)(1),
(2), (4) Date: Jul. 1, 2002

(87) PCT Pub. No.: WO01/98117

PCT Pub. Date: Dec. 27, 2001

(65) Prior Publication Data

US 2002/0180596 A1 Dec. 5, 2002

(30) Foreign Application Priority Data

Jun. 21, 2000 (DE) .......................... 100 30 465

(51) Int. Cl.⁷ ............................................... B60Q 1/00
(52) U.S. Cl. ...................... 340/436; 340/435; 340/903; 180/274; 180/275; 701/46; 701/48; 701/301; 73/379.04
(58) Field of Search ................................ 340/436, 435, 340/901, 903, 904; 180/274, 275, 271; 701/45, 46, 48, 301; 73/12.01, 379.04, 379.05

(56) References Cited

U.S. PATENT DOCUMENTS

| | | | | |
|---|---|---|---|---|
| 3,853,199 A | * | 12/1974 | Hirashima et al. | 180/274 |
| 4,934,477 A | * | 6/1990 | Dai | 180/271 |
| 5,767,766 A | * | 6/1998 | Kwun | 340/436 |
| 6,212,456 B1 | * | 4/2001 | Stride | 701/45 |
| 6,329,910 B1 | * | 12/2001 | Farrington | 340/436 |
| 6,553,846 B2 | * | 4/2003 | Mattes | 73/862.045 |

FOREIGN PATENT DOCUMENTS

| | | |
|---|---|---|
| DE | 28 21 156 | 7/1980 |
| DE | 19718803 | * 5/1997 |
| GB | 2336704 | * 10/1999 |
| GB | 2376118 | * 6/2001 |
| JP | 08 216 826 | 8/1996 |
| JP | 11 310 095 | 11/1999 |
| JP | 2000 025 562 | 1/2000 |
| WO | 97 18108 | 5/1997 |

* cited by examiner

Primary Examiner—Nina Tong
(74) Attorney, Agent, or Firm—Kenyon & Kenyon

(57) ABSTRACT

A method of deciding with a high reliability whether an impact with the front side of a vehicle has been caused by a pedestrian is described. Two decision criteria are formed, and only if both decision criteria are met is it decided an impact with a pedestrian has occurred. The first decision criterion is determined by the fact that the pressures or deformations measured by a sensor on the bumper and a sensor in the area of the front edge of the engine hood are compared with reference quantities typical of impact with a pedestrian. The second decision criterion is determined by the fact that the changes in velocity and/or acceleration of the vehicle caused by an impact are determined, and then the changes in velocity and/or acceleration are compared with reference quantities which are typical of impact with a pedestrian.

11 Claims, 3 Drawing Sheets

METHOD AND DEVICE FOR RECOGNITION OF A COLLISION WITH A PEDESTRIAN

FIELD OF THE INVENTION

The present invention relates to a method and a device for detecting the impact of a pedestrian with a vehicle, at least one sensor being provided on the bumper and at least one sensor in the area of the front edge of the hood of the engine to measure the pressures or deformations caused by impact and to form a first criterion for the decision as to whether there has been an impact with a pedestrian on the basis of the sensor output signals by comparison with reference quantities.

BACKGROUND INFORMATION

A method of detecting an impact of a pedestrian with a passenger vehicle is discussed in PCT Publication No. WO 97/18108. To protect the pedestrian from serious injuries in the event of an impact of a pedestrian with the front side of a vehicle, one or more airbags may be provided on the engine hood or on the windshield for deployment in the event of an impact with a pedestrian. Another safety measure for an impact with a pedestrian is for the engine hood to be inclined at an angle to catch the pedestrian. Deployment of such safety devices may depend upon the impact with a pedestrian being detected reliably and also being differentiated unambiguously from impacts with other objects. The related art discusses utilizing for detection of a pedestrian impact the basic kinematics of a pedestrian on impact with the front side of a passenger vehicle. As a rule, the first point of contact of a pedestrian with a vehicle is the bumper. Therefore, a first sensor which responds to the acting force or the deformation may be located on the bumper of the vehicle. Through contact with the bumper, the pedestrian may receive a rotational momentum which throws him onto the engine hood. In other words, impact with the bumper may be followed after a time lag by another impact with the engine hood. Therefore, a second sensor which responds to pressure or deformation may be situated on the front edge of the engine hood. The sensor output signals may be compared with reference quantities that are representative for impacts with a pedestrian. If they match or if there is a correspondence within a certain range of tolerance between the sensor output signals and the reference quantities, it may be decided that this is due to an impact with a pedestrian. As a result of this decision, the available safety devices may therefore be deployed.

An object of the present invention is to provide a method and a device with which it is possible in the event of an impact on the front side of a vehicle to decide with the highest possible reliability whether this impact has been caused by a pedestrian.

SUMMARY OF THE INVENTION

An exemplary embodiment of the invention involves at least one sensor mounted on the bumper and at least one sensor in the area of the front edge of the engine hood to measure the pressures or deformations caused by an impact. In the exemplary embodiment, the sensor output signals are compared with reference quantities to derive a first criterion for the decision as to whether it is a pedestrian impact, and the change in velocity and/or acceleration of the vehicle caused by the impact may be determined. By comparing the change in velocity and/or acceleration with a reference quantity, a second criterion for deciding whether it is a pedestrian impact may be formed, and when both decision criteria are met, the decision may be made that it is a pedestrian impact.

In addition to the first known decision criterion, another decision criterion may be formed from the change in velocity and/or acceleration of the vehicle because of an impact, and the decision for a pedestrian impact may be made on the basis of the two decision criteria. Therefore, a high reliability may be achieved in detecting an actual impact with a pedestrian.

In deriving the second decision criterion, it may be expedient to take into account braking which is initiated before an impact, because this has an effect on the change in velocity and/or acceleration of the vehicle caused by an impact. In the case of braking initiated before an impact, the second decision criterion may be derived from the change in acceleration alone because in the case of brake-locked wheels, the velocity sensors present in the vehicle will yield a value of 0. Thus, in this situation, no change in velocity may be determined by comparison of the velocities before and after an impact. The situation may be different with an acceleration measurement, which may be performed independently of movement of the wheels of the vehicle.

Reference quantities for the sensor output signals may include, for example, signal amplitudes typical of a pedestrian impact. The reference quantity used could also be the signal sequence of sensor output signals over time typical of an impact with a pedestrian.

Pressure and deformation sensors based on different measurement principles may also be used. These may include sensors made of wire strain gauges or piezo films or sensors utilizing the anisotropic magnetoresistive effect or the Hall effect. It also may be possible to use sensors having a pressure-dependent light transmission characteristic.

DETAILED DESCRIPTION

Figure 1:
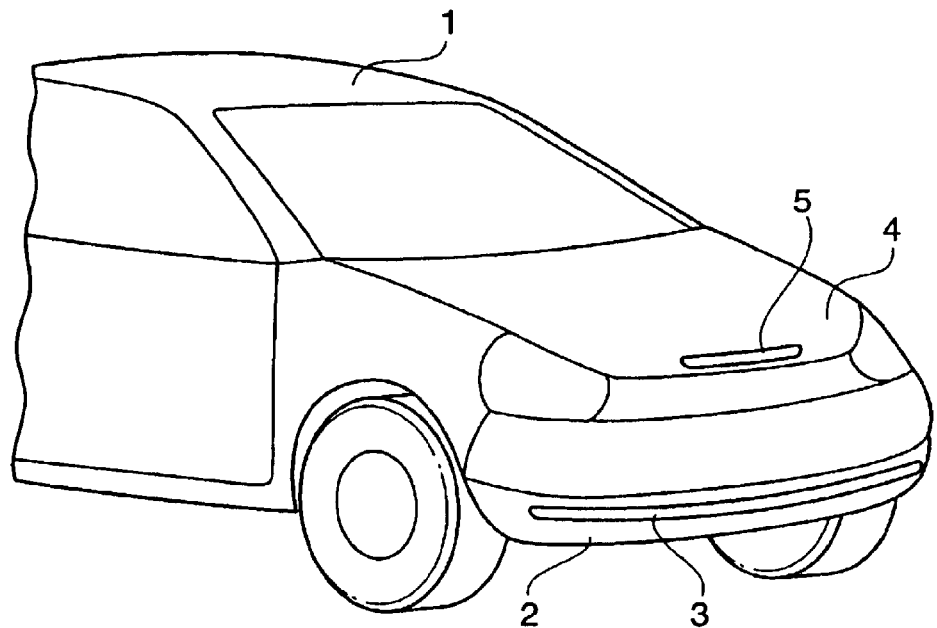
FIG. 1 shows a front view of a motor vehicle having two sensors.

In an exemplary embodiment for detecting with the highest possible certainty whether a given impact with the front side of a vehicle is a pedestrian impact, vehicle 1 is equipped with a first sensor 3 on its bumper 2, as shown in FIG. 1, and a second sensor 5 on the front edge of its engine hood 4. Both sensors 3 and 5 may be pressure sensors or deformation sensors. Therefore, sensors 3, 5 may be mounted on bumper 2 as well as on the front edge of engine hood 4 because it may then be possible to detect the characteristic kinematics of a pedestrian impact with vehicle 1. In other words, if a vehicle strikes a pedestrian at its front side, the pedestrian may first come in contact with the bumper, so that sensor 3 on bumper 2 delivers a signal which depends on pressure or deformation. Bumper 2 absorbs only a small portion of the total kinetic impact energy. Contact with the bumper may impart to the pedestrian a rotational momentum, possibly throwing him onto the hood of the engine. Second sensor 5 on engine hood 4 may then detect this pressure or deformation produced by the impact with the pedestrian.

Figure 2:
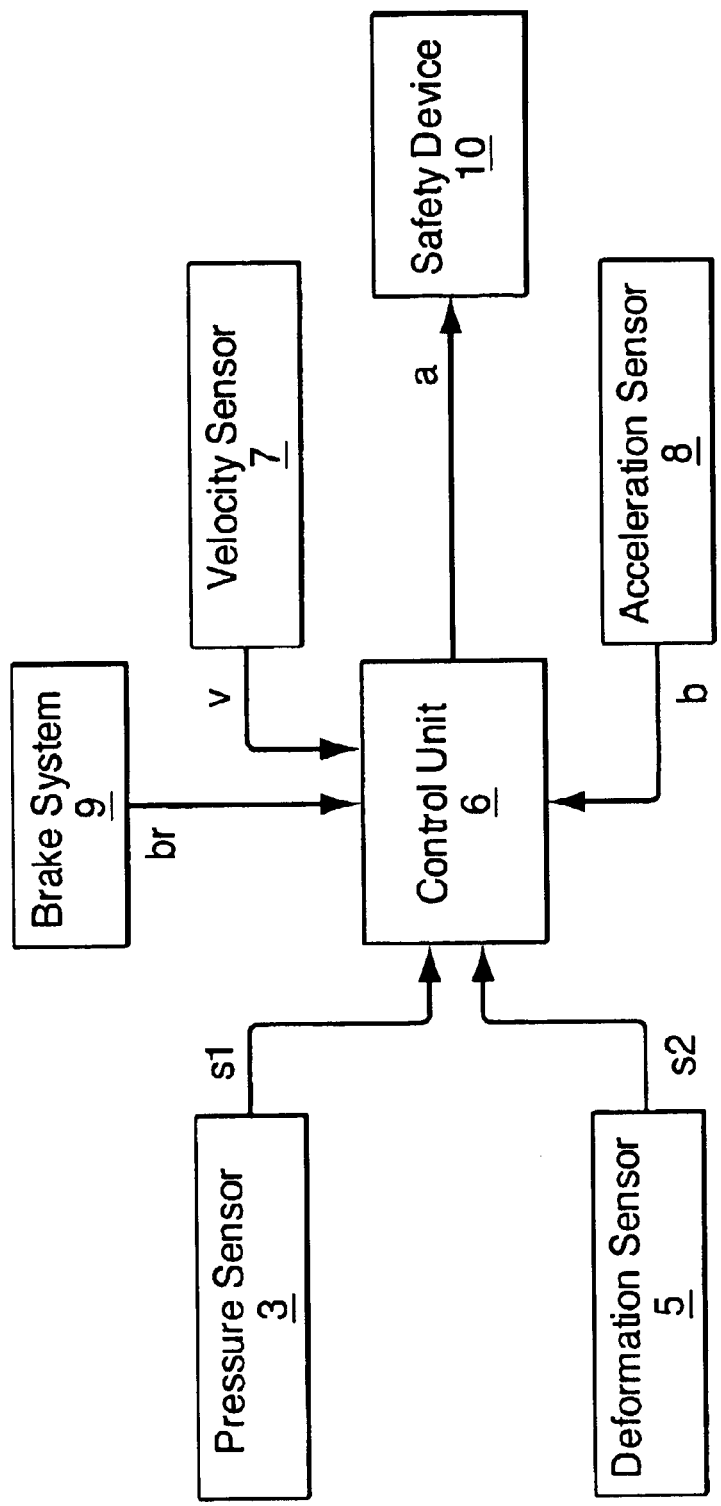
FIG. 2 shows a block diagram of a device for detecting an impact with a pedestrian.
Figure 4:
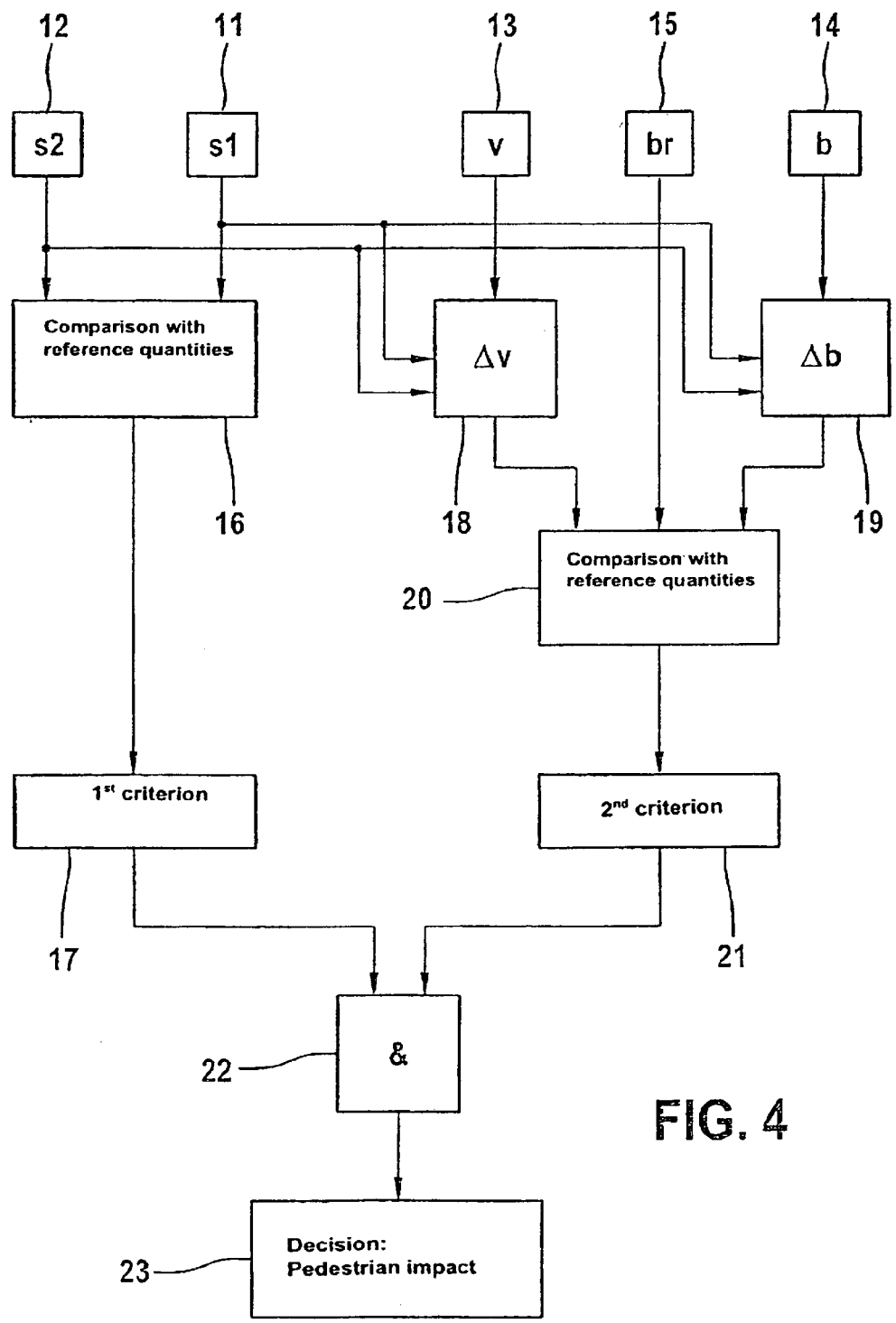
FIG. 4 shows a flow chart of the method for detecting an impact with a pedestrian.

FIG. 2 shows a block diagram of a device, and FIG. 4 shows a flow chart of a method, with which impact with a pedestrian may be detected with a high reliability. In FIG. 2, reference numbers 3 and 5 denote pressure and deformation sensors mounted on the bumper and on the engine hood of the vehicle.

When sensor 3 on bumper 2 and sensor 5 on engine hood 4 are mentioned here, this also includes the possibility of multiple sensors or sensor elements being present on both bumper 2 and engine hood 4. Sensors based on different principles for measurement of pressure and deformation may be used. For example, the sensors may be wire strain gauges or piezoresistive films. Optical sensors having a pressure-dependent light transparency may also be used. Likewise, sensors based on the Hall effect or the anisotropic magnetoresistive effect may also be used. Any sensor which produces a pressure- or deformation-dependent signal, regardless of the method, may be suitable in principle.

Output signals s1 and s2 of sensors 3 and 5 may be sent to control unit 6. In addition, output signal v of velocity sensor 7, acceleration signal b of acceleration sensor 8, and brake signal br delivered by brake system 9 may all be sent to control unit 6. If control unit 6 decides on the basis of aforementioned input signals s1, s2, v, b, br that an impact with the front side of the vehicle has been produced by a pedestrian, then control unit 6 delivers deployment signal a to safety device 10. Safety device 10 may be, for example, one or more airbags arranged on the engine hood or on the frame of the windshield. The airbags may be adapted to inflate on impact with a pedestrian. Furthermore, to protect the pedestrian, engine hood 4 may be inclined at an angle by a spring mechanism or a pyrotechnic mechanism when control unit 6 delivers deployment signal a.

FIG. 4 illustrates a method of detecting a pedestrian impact in a flow chart. Pressures and/or deformations s1 and s2 occurring on bumper 2 and on engine hood 4 may be measured with sensors 3 and 5 in method steps 11 and 12. In addition, velocity v and acceleration b of the vehicle may be measured continuously according to method steps 13 and 14. Brake signal br may also be determined according to method step 15.

Figure 3:
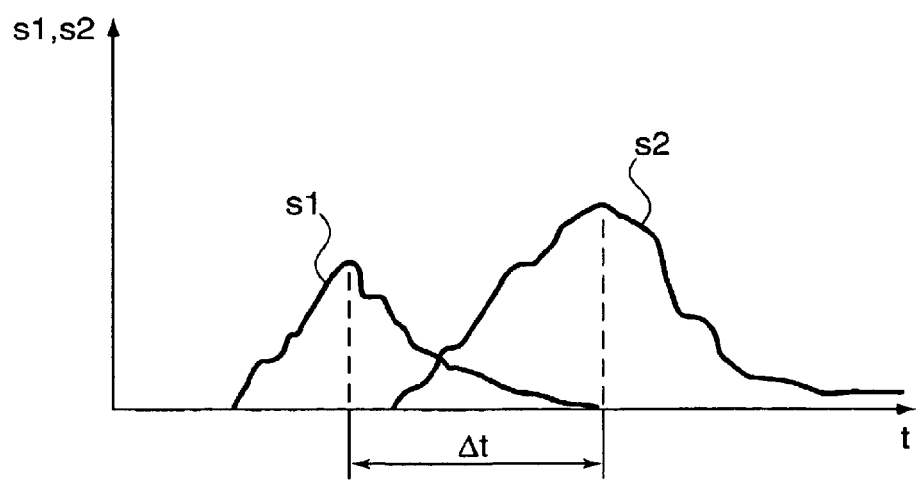
FIG. 3 shows curves of sensor output signals in an impact with a pedestrian.

In method step 16, sensor signals s1 and s2 are compared with reference quantities characteristic for a pedestrian impact. FIG. 3 shows curves for both sensor signals s1 and s2 which may be typical of a pedestrian impact. First, sensor 3 on bumper 2 of the vehicle delivers output signal s1 because, upon impact with a pedestrian, the pedestrian will first come in contact with bumper 2. Output signal s2 of sensor 5 on engine hood 4 follows with a time lag $\Delta t$ which is typical of a pedestrian impact. The amplitudes of output signals s1 and s2 of sensors 3 and 5, as well as time lag $\Delta t$ between two output signals s1 and s2, may be characteristic of a pedestrian impact. These characteristic quantities may be used in method step 16 as reference quantities with which output signals s1 and s2 of sensors 3 and 5 are compared. This comparison may be a threshold value comparison. If signals s1 and s2 match exactly or if they correspond to the reference quantities within a certain tolerance range, then in method step 17 this may be regarded as satisfying a first criterion for deciding that the impact has been caused by a pedestrian.

In method step 18, change in velocity $\Delta v$ of the vehicle caused by the impact is determined by forming the difference between velocity v of the vehicle before impact s1, as measured by sensor 3 on bumper 2, and velocity v of the vehicle after impact s2, as measured by sensor 5 on engine hood 4. Likewise, the change in acceleration $\Delta b$ of the vehicle caused by the impact is determined in method step 19. The change in acceleration $\Delta b$ is obtained from the difference between the acceleration b measured before impact with the bumper and the acceleration b measured after impact with the engine hood. Acceleration b may preferably be determined with an acceleration sensor which is also used for controlling deployment of the restraint systems in the vehicle.

In method step 20, the change in velocity $\Delta v$ thus determined and the change in acceleration $\Delta b$ thus determined are each compared with a reference quantity. The velocity range in which the safety device for the pedestrian is to be deployed may be approximately in the range of 15 km/h to 55 km/h. The velocity of the vehicle may change by approximately 5 km/h in a pedestrian impact, and the acceleration may change by approximately 3 g (g is the acceleration due to gravity) if there is no braking before or during the impact, or by approximately 4 g if there is braking. To take into account the braking operation in determining the reference quantities, brake signal br regarding a braking operation may also be taken into account in method step 20.

If change in velocity $\Delta v$ and change in acceleration $\Delta b$ during impact match the reference quantities, or if they match them within a certain tolerance range, then in method step 21 a second criterion for the decision that a pedestrian impact has occurred is considered to be satisfied. The second decision criterion may also be a function of either the change in velocity $\Delta v$ alone or the change in acceleration $\Delta b$ alone. However, if braking is already performed before impact, then the change in velocity $\Delta v$ may not be used to form the second decision criterion, because in brake-locked wheels, the measured velocity has a value of 0 and therefore may no longer be used for determining velocity difference $\Delta v$.

In method step 22, the two decision criteria determined in steps 17 and 21 are subjected to an AND operation, and if both decision criteria are met, it is decided in method step 23 that it is a pedestrian impact. As a result of this, available pedestrian safety devices may be deployed.

What is claimed is:

1. A method of detecting a pedestrian impact with a vehicle, the method comprising:

providing at least one first sensor on a bumper and at least one second sensor in an area of a front edge of an engine hood;

measuring one of a first pressure and a first deformation caused by the pedestrian impact;

forming a first criterion for deciding whether the pedestrian impact has occurred by comparing at least one first sensor output signal with at least one first reference quantity and by comparing at least one second sensor output signal with at least one second reference quantity;

determining at least one of a change in velocity of the vehicle and a change in acceleration of the vehicle caused by the pedestrian impact;

forming a second criterion for deciding whether the pedestrian impact has occurred by at least one of comparing the change in velocity with a third reference quantity and comparing the change in acceleration with a fourth reference quantity; and determining that the pedestrian impact has occurred if both the first criterion and the second criterion are met.

2. The method according to claim 1, wherein the forming of the second criterion takes into account a braking that is initiated before the pedestrian impact.

3. The method according to claim 1, wherein the forming of the second criterion is based only on the change in acceleration if a braking is initiated before the pedestrian impact.

4. The method according to claim 1, wherein the forming of the first criterion includes:
  comparing an amplitude of the at least one first sensor output signal with a first reference amplitude typical of the pedestrian impact; and
  comparing an amplitude of the at least one second sensor output signal with a second reference amplitude typical of the pedestrian impact.

5. The method according to claim 1, further comprising:
  comparing a chronological sequence of the at least one first sensor output signal and the at least one second sensor output signal with a chronological signal typical of the pedestrian impact.

6. A device for detecting a pedestrian impact with a vehicle, comprising:
  at least one first sensor arranged on a bumper, the at least one first sensor measuring one of a first pressure and a first deformation caused by the pedestrian impact, the at least one first sensor producing a first sensor output signal;
  at least one second sensor arranged in an area of a front edge of an engine hood, the at least one second sensor measuring one of a second pressure and a second deformation caused by the pedestrian impact, the at least one second sensor producing a second sensor output signal;
  an arrangement for comparing the first sensor output signal with a first reference quantity and the one second sensor output signal with a second reference quantity in order to determine a first criterion for a decision as to whether the pedestrian impact has occurred;
  an arrangement for detecting at least one of a velocity change caused by the pedestrian impact and an acceleration change caused by the pedestrian impact;
  an arrangement for deriving a second criterion for the decision as to whether the pedestrian impact has occurred by comparing at least one of the velocity change to a third reference quantity and the acceleration change to a fourth reference quantity; and
  an arrangement for deciding that the pedestrian impact has occurred if both the first criterion and the second criterion are met.

7. The device according to claim 6, wherein the at least one first sensor includes a first wire strain gauge and the at least one second sensor includes a second wire strain gauge.

8. The device according to claim 6, wherein the at least one first sensor includes a first piezoelectric film and the at least one second sensor includes a second piezoelectric film.

9. The device according to claim 6, wherein the at least one first sensor and the at least one second sensor are based on an anisotropic magnetoresistive effect.

10. The device according to claim 6, wherein the at least one first sensor and the at least one second sensor are based on a Hall effect.

11. The device according to claim 6, wherein the at least one first sensor and the at least one second sensor include elements having pressure-dependent light-transmission characteristics.

* * * * *